June 18, 1935. W. S. GRAFF-BAKER 2,005,067
MOVING STAIRWAY
Filed July 6, 1934 7 Sheets-Sheet 2

William Sebastian Graff-Baker INVENTOR
BY Walter E.S. Bradley ATTORNEY

June 18, 1935.  W. S. GRAFF-BAKER  2,005,067
MOVING STAIRWAY
Filed July 6, 1934  7 Sheets-Sheet 3
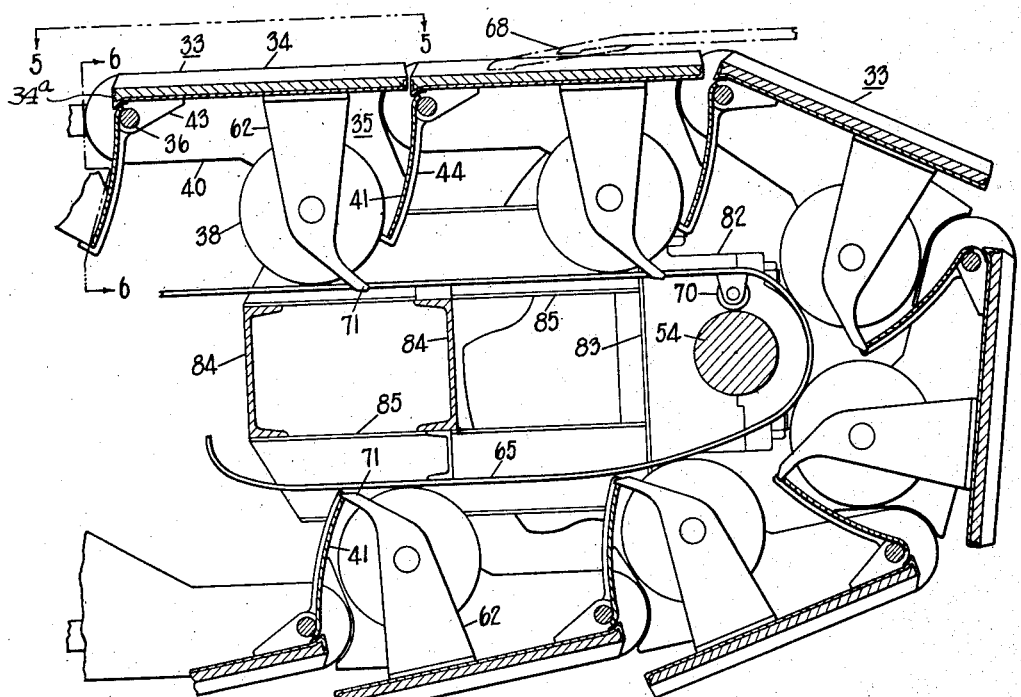
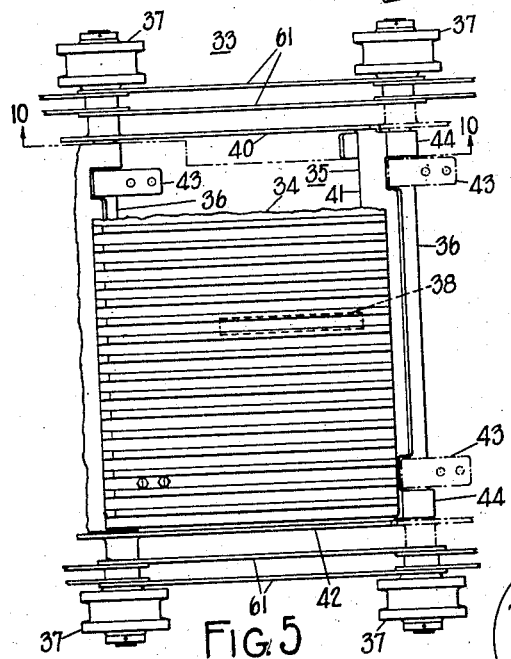
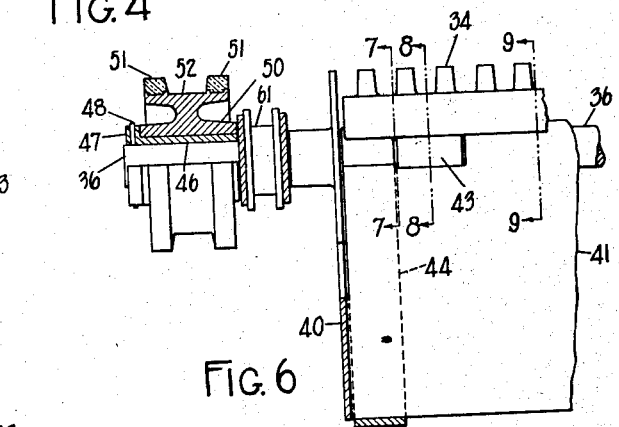
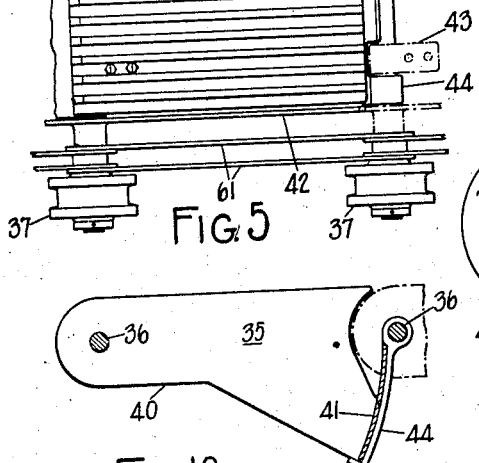
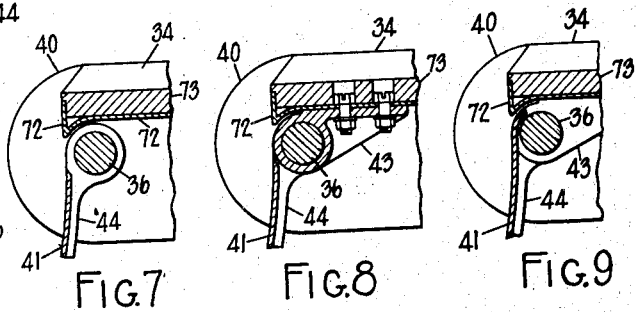
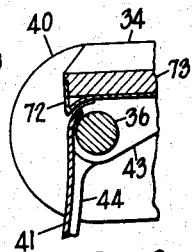
William Sebastian Graff-Baker INVENTOR
BY Walter E. S. Bradley ATTORNEY

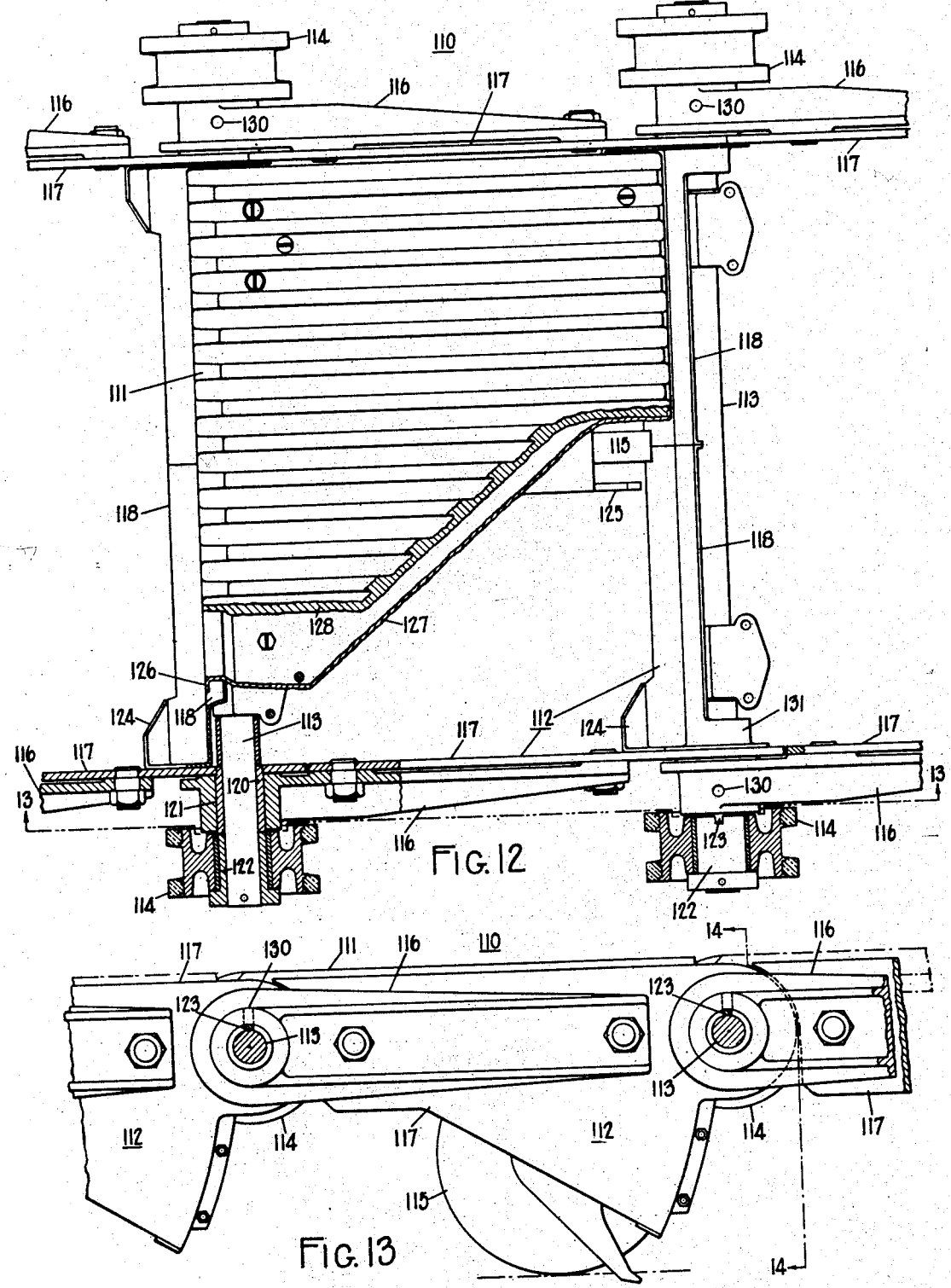

June 18, 1935.　　　W. S. GRAFF-BAKER　　　2,005,067

MOVING STAIRWAY

Filed July 6, 1934　　　7 Sheets-Sheet 5

William Sebastian Graff-Baker INVENTOR

BY Walter E. S. Bradley　ATTORNEY

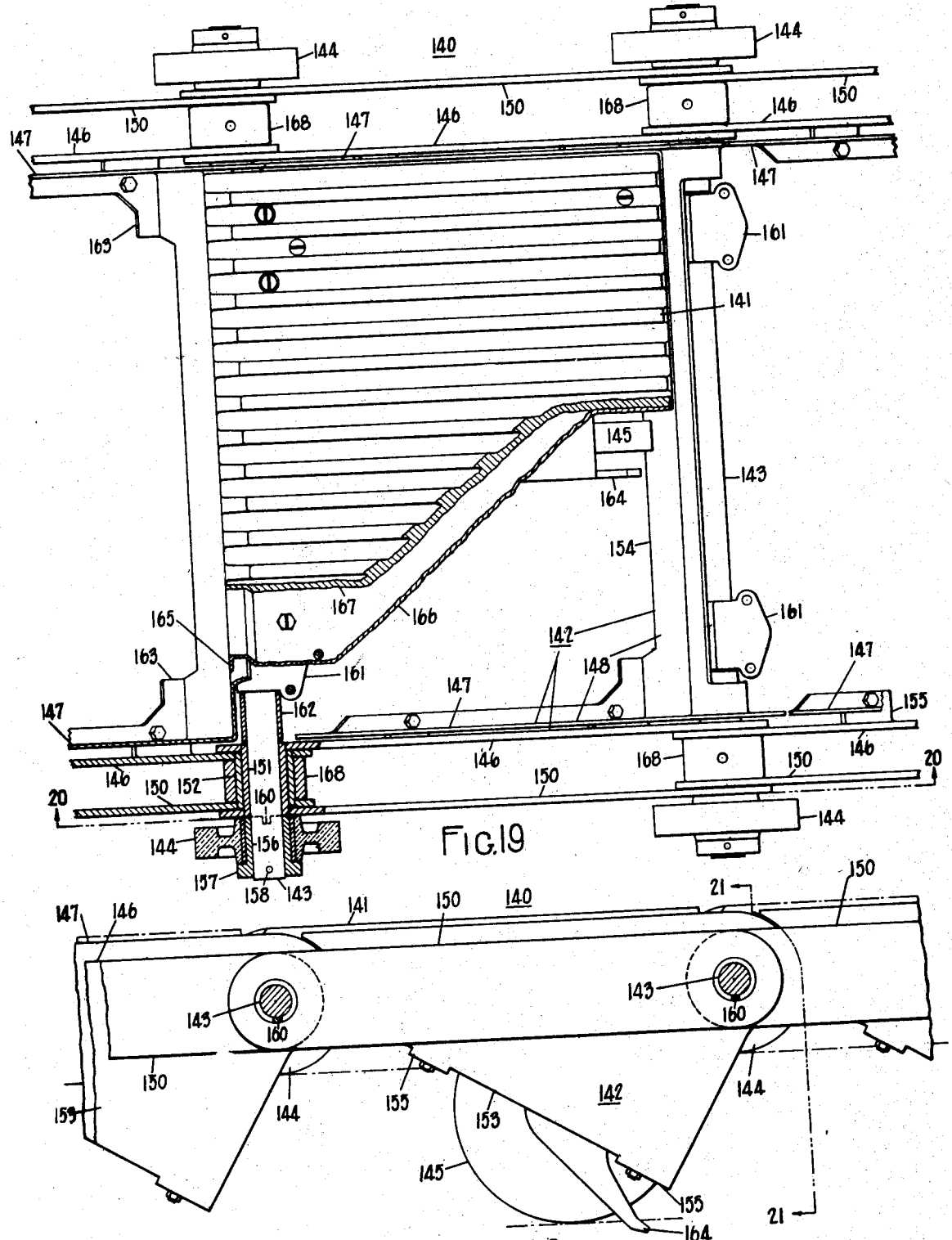

June 18, 1935.  W. S. GRAFF-BAKER  2,005,067
MOVING STAIRWAY
Filed July 6, 1934    7 Sheets-Sheet 7
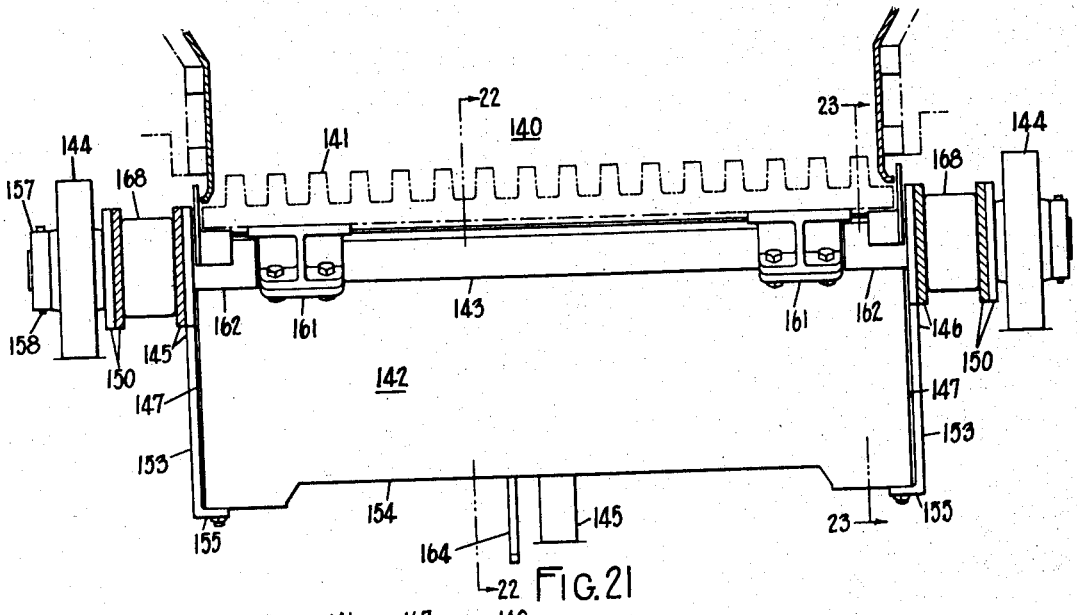
FIG. 21
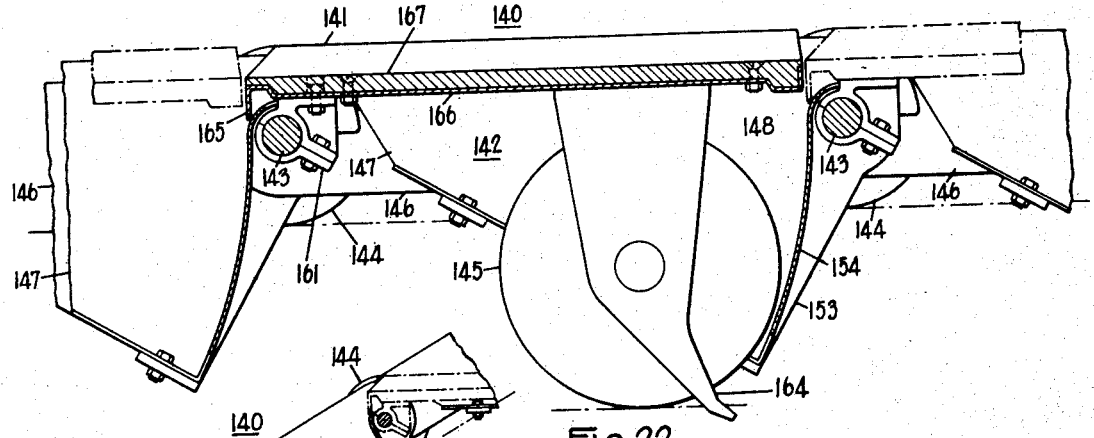
FIG. 22
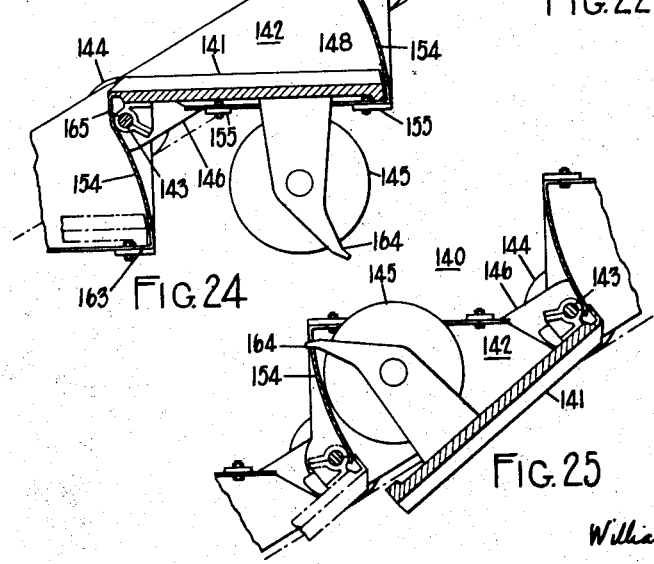
FIG. 24
FIG. 25
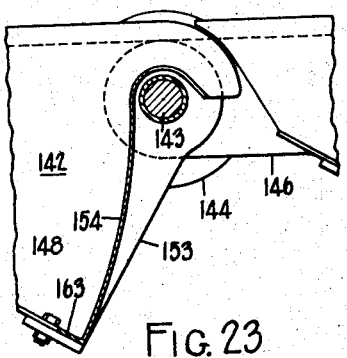
FIG. 23
William Sebastian Graff-Baker INVENTOR
BY Walter E. Bradley  ATTORNEY Patented June 18, 1935

2,005,067

UNITED STATES PATENT OFFICE 2,005,067

MOVING STAIRWAY

William Sebastian Graff-Baker, Kensington, London, England, assignor to Otis Elevator Company, New York, N. Y., a corporation of New Jersey Application July 6, 1934, Serial No. 733,975
In Great Britain July 10, 1933

9 Claims. (Cl. 198—16)

This invention relates to moving stairways.

It is the object of this invention to provide a moving stairway which is of simple design, which is compact, especially at the landings, and which is silent and safe in operation.

Among the features of the moving stairway in accordance with this invention are the following:

The stairway is formed of an endless series of step units each hinged or pivotally connected to the next adjacent step unit. The primary elements of each step unit are the step pocket or frame and the step tread. Each step pocket is formed with three sides, two of which, one at each side of the stairway, are parallel to the longitudinal axis of the stairway and are termed "longitudinal sides". The third side extends transversely across the stairway to connect the two longitudinal sides, and is termed the "transverse side". Adjacent step pockets are pivotally connected, preferably at each side of the stairway, with a rod extending transversely across the stairway connecting corresponding hinge or pivot points at opposite sides of the stairway. These rods are termed "step axles". A step wheel is rotatably mounted on each step axle at each side of the stairway, and tracks for these step wheels are provided to support and guide the step units throughout the working and return runs of the stairway. Each step tread is pivotally supported adjacent its nose to its corresponding step pocket, preferably by pivotally mounting the step tread upon the step axle for such step pocket. Each step tread may thus rotate relatively to the sides of its associated step pocket, the transverse side thereof being curved so that there is a small, uniform clearance between it and the free end of the step tread as the step tread moves relative thereto. The transverse side of the step pocket of one step unit thus serves as the riser for the step tread of the next adjacent step unit.

Rotation of the step treads relative to their respective step pockets is controlled through tread wheels rotatably secured to the step treads and through tread wheel tracks upon which the tread wheels roll, the tread wheel tracks being suitably related to the path taken by the step pockets to bring about such relative motion as is desired. The tread wheels and tread wheel tracks also serve to support the free ends of the step treads to maintain the step treads horizontal when the step units are in platform formation and when the step units change from platform formation to stair formation, and vice versa. Preferably each step tread is provided with only one tread wheel, at substantially midway between the sides of the step tread, and secured to the underside thereof, assuming the step unit to be on the working run of the stairway. Only one tread wheel track, at the center of the stairway, is therefore required.

While the step units are on the incline portion of the working run of the stairway—at which time the step units are in stair formation with each step tread in an inwardly rotated position with respect to its corresponding step pocket—the free end of each step tread is supported by its corresponding step pocket. While the step units are on the return run of the stairway—at which time the step units are inverted and each step tread is in an outwardly rotated position with respect to its corresponding step pocket—the free end of each step tread is likewise supported by its corresponding step pocket. The tread wheel track for the tread wheels thus needs to be provided only in the vicinity of the landings, and may be dispensed with elsewhere. The support for the free end of the step tread when in its inwardly rotated position conveniently comprises two projections or stops at either side of the stairway extending from the transverse side of the step pocket near the bottom edge thereof into the path of the step tread so as to engage the underside of the step tread. These projections or stops likewise serve to define the limit of the inward motion of the step tread. The support for the free end of the step tread when in its outwardly rotated position conveniently comprises an extension of the step tread bracket upon which the tread wheel is mounted, such extension being shaped so that it engages the bottom edge of the transverse side of the step pocket. Such extension, in conjunction with the transverse side, also serves to define the limit of the outward motion of the step tread.

The endless stairway running gear chain may be provided along each longitudinal side of the endless series of step pockets to assume the longitudinal stresses of the stairway, each such chain having rigid links and a chain pitch equal to the step pitch of the stairway so that the step axles pass through hollow chain pins of such chains or serve as the chain pins thereof. Alternately, instead of such running gear chains being structurally separate from the longitudinal sides of the step pockets, constructions may be employed in which portions or all of the same structure serve both as links of running gear chains which assume the longitudinal stresses of the stairway and as portions or all of the longitudinal sides of the step pockets.

Stairway sprocket wheels at each side of the stairway are provided at the lower landing for transferring the step units from the return to the working run of the stairway, and vice versa. Similar stairway sprocket wheels at each side of the stairway are provided at the upper landing for transferring the step units from the working to the return run of the stairway, and vice versa, and for driving the stairway. These stairway sprocket wheels have a chordal pitch equal to the step pitch of the stairway, and are arranged to engage either the step wheels on the step axles or other wheels or bushings concentric with the step axles.

Stairway sprocket wheels having a relatively small number of teeth are preferably employed in order that the size of such sprocket wheels may not be inconveniently large. In order to drive the stairway at a uniform linear speed by stairway sprocket wheels having such a relatively small number of teeth, a compensating drive is interposed between the upper landing stairway sprocket wheels and a uniformly driven drive sprocket wheel. This compensating drive causes the upper landing stairway sprocket wheels to rotate at cyclically varying angular speeds in such manner that the inherent character of such upper landing stairway sprocket wheels to impart to the stairway linear speeds cyclically differing from a fixed value, when they are rotated at a uniform angular speed, is compensated for by such cyclic variations in the instantaneous angular velocity of the upper landing stairway sprocket wheels. The compensating drive herein illustrated comprises an auxiliary sprocket wheel mounted on the same shaft—the drive shaft—upon which the upper landing stairway sprocket wheels are mounted and keyed, the auxiliary sprocket wheel, however, being freely rotatable with respect to such shaft, and being positioned adjacent to, and at the outer side of, one of the upper landing stairway sprocket wheels. The auxiliary sprocket wheel is driven at a uniform angular speed by means of a suitable drive chain connecting it and the drive sprocket wheel. Also mounted upon the drive shaft is a disc, normally held stationary by suitable means which preferably affords adjustment of the position of the disc about the drive shaft. This disc has formed therein an annular cam groove of uniform radial width the inner surface of which is at an irregular radial distance from the axis of the drive shaft, the irregularity consisting of a series of gradual variations in the radial distance of the inner surface of the cam groove from the axis of the drive shaft, and there being as many points or lobes of maximum radial distance as there are number of teeth in each stairway sprocket wheel. A cam roller, arranged to fit in the cam groove with but a small clearance, is rotatably mounted at one end of a link. The other end of this link is pivotally secured to the auxiliary sprocket wheel through a second link. The first link is also pivotally secured between its ends to a pin mounted on the adjacent upper landing stairway sprocket wheel and extending through a suitable slotted aperture in the auxiliary sprocket wheel. With this construction, as the auxiliary sprocket wheel rotates, the linkage connected thereto rotates and causes the cam roller to roll on the outer or the inner surface of the cam groove, depending upon whether the auxiliary sprocket wheel is rotated to drive the stairway in the ascending or descending direction, respectively. As the cam roller rolls in the irregular cam groove, the radial displacements of the cam roller end of the first link cause angular displacements of the upper landing stairway sprocket wheels relative to the constant speed auxiliary sprocket wheel, with the result that the upper landing stairway sprocket wheels are driven at cyclically varying angular speeds.

Other features and advantages will become apparent from the specification taken in conjunction with the accompanying drawings.

In the drawings:

Figure 4 is a sectional view of the stairway taken along the line 4—4 of Figure 2;

Figure 5 is a plan view of one step unit and related apparatus, taken as indicated by the line 5—5 of Figure 4;

Figure 6 is an enlarged view of a portion of a step unit taken along the line 6—6 of Figure 4;

Figure 7 is a sectional view of a step unit taken along the line 7—7 of Figure 6;

Figure 8 is a sectional view of a step unit taken along the line 8—8 of Figure 6;

Figure 9 is a sectional view of a step unit taken along the line 9—9 of Figure 6;

Figure 10 is a sectional view of a step unit taken along the line 10—10 of Figure 5;

Figure 12 is a plan view of an alternate construction for a step unit and related apparatus in accordance with the invention, with certain parts broken away and certain other parts shown in section;

Figure 13 is a side elevation of the step unit shown in Figure 12, taken along the line 13—13 of Figure 12;

Figure 19 is a plan view of another alternate construction for a step unit and related apparatus in accordance with the invention, with certain parts broken away and certain other parts shown in section;

Figure 20 is a side elevation of the step unit shown in Figure 19, taken along the lines 20—20 of Figure 19;

Figure 21 is an end view of the step unit and related apparatus taken along the line 21—21 of Figure 20;

Figure 22 is a sectional view of a step unit taken along the line 22—22 of Figure 21;

Figure 23 is a sectional view of a portion of a step unit, taken along the line 23—23 of Figure 21;

Figure 24 is a longitudinal sectional view of the step unit of Figure 19, showing the position of the parts when the step unit is on the inclined portion of the working run of the stairway; and Figure 25 is a sectional view similar to that of Figure 24, illustrating the position of the parts when the step unit is on the inclined portion of the return run of the stairway.

Figure 1:
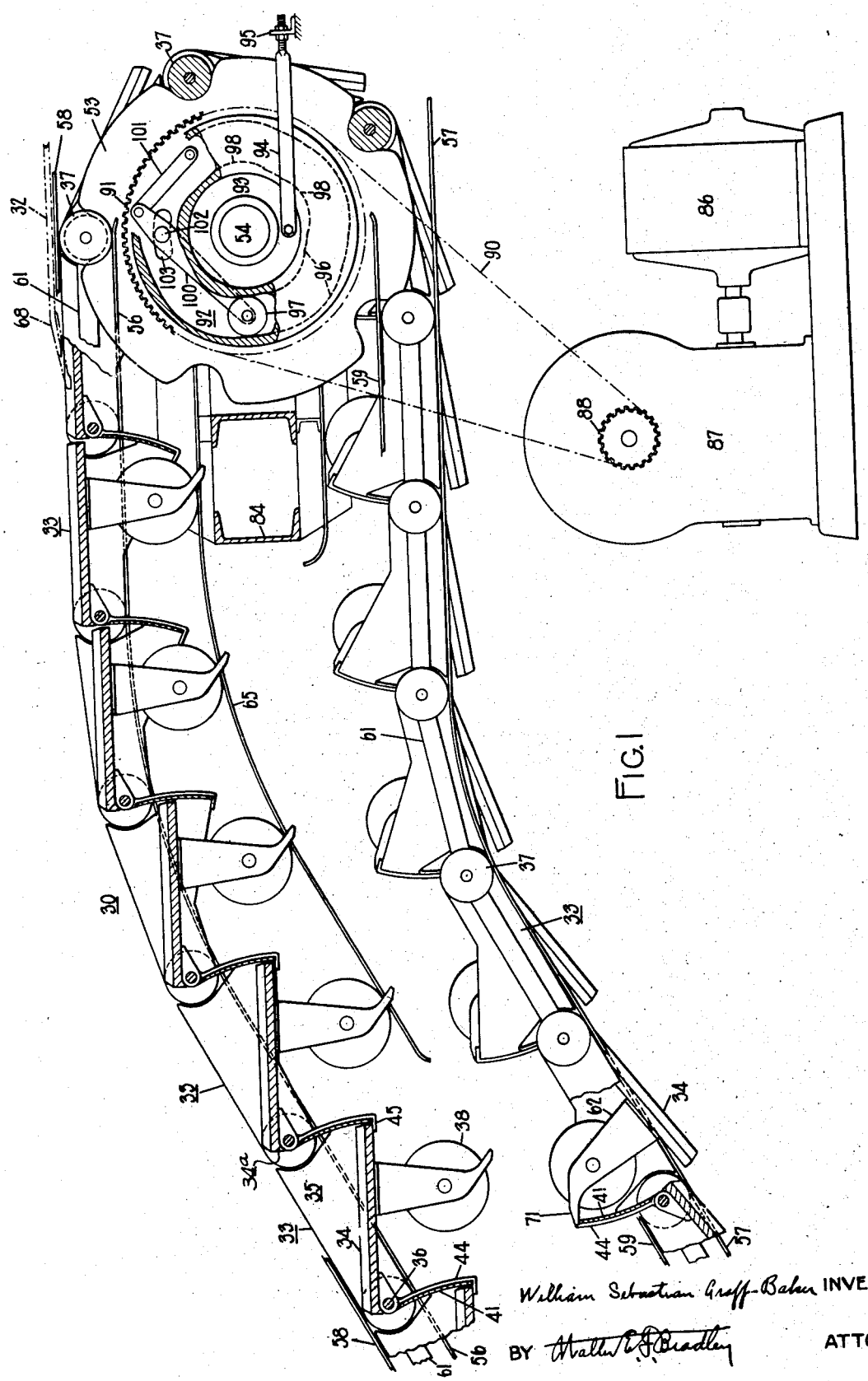
Figure 1 is a side elevation of the upper landing portion of a moving stairway in accordance with the invention, with certain parts broken away and certain other parts shown in section.

Referring to Figures 1–11 of the drawings, a moving stairway generally designated 30 operates between a lower landing 31 (see Figure 11) and an upper landing 32. Each stairway comprises a plurality of step units generally designated 33, hinged or pivotally connected together to form an endless series of step units. Each step unit comprises a step tread 34, a step pocket 35, a step axle 36, two step wheels 37 (one at each side of the stairway), and a tread wheel 38, together with certain other apparatus which will become apparent as the description proceeds.

Step pocket 35, conveniently a die-casting, has two longitudinal sides 40 and 42 (Figure 5), and a transverse side 41 connecting longitudinal sides 40 and 42, transverse side 41 serving as the riser for the step tread of the next adjacent step unit. Step axle 36 extends transversely between the ends of the longitudinal sides 40 and 42 opposite the ends thereof connected by transverse side 41. Step tread 34 is pivotally mounted at its nose 34a upon step axle 36 so that it may rotate in step pocket 35 relatively to the sides thereof, transverse side 41 being concave in shape so that a constant clearance between it and the free end of step tread 34 is maintained as the step tread rotates in the step pocket. The pivotal mounting for step tread 34 is effected by step tread bearings 43 secured to the underside of step tread 34 (Figure 8), bearings 43 engaging step axle 36.

Step axle 36 also serves as the hinge or pivot pin for the hinge or pivotal connection of adjacent step units. Thus, step axle 36 extends through apertures in the longitudinal sides of the step pocket 35 of the corresponding step unit 33 and also through apertures formed at the top of straps 44 that are suitably secured, at each side of the stairway, to the transverse side 41 of the step pocket of the next adjacent step unit (Figures 7 and 10). The lower portions of straps 44 for each step unit extend under the transverse side of the step pocket of the corresponding step unit and into the path of the pivotal movement of the corresponding step tread 34 about its step axle 36, to form stops 45 (Figure 10). Stops 45 serve to limit the movement of the step treads and to support the free ends of the step treads when the respective step units are positioned along the inclined portion of the upper, or working, run of the stairway, as illustrated at the extreme left of Figure 1.

Each step axle 36 extends beyond each of the longitudinal sides of its corresponding step pocket and on each such extension of step axle 36 is rotatably mounted the step wheel 37 for the corresponding side of the stairway. In so mounting each step wheel 37, a bushing 46 (see Figure 6) is preferably interposed between such step wheel and the step axle. Bushing 46 has formed at its outer end a collar 47 which serves to prevent outward axial motion of the step wheel, collar 47 being secured to step axle 36 by means of a suitable cotter or taper pin 48.

Each step wheel 37, in the construction illustrated in Figures 1–11, is formed of a metallic body 50 (see Figure 6) with a non-metallic tread surface 51, such as phenol canvas or radially-disposed circumferentially-compressed fabric squares, suitably fixed to metallic body 50. As illustrated, each step wheel 37 is preferably provided with two such non-metallic tread surfaces 51 on either side of an exposed cylindrical surface 52 of body member 50, cylindrical surface 52 having a diameter less than that of the non-metallic tread surfaces 51.

Figure 2:
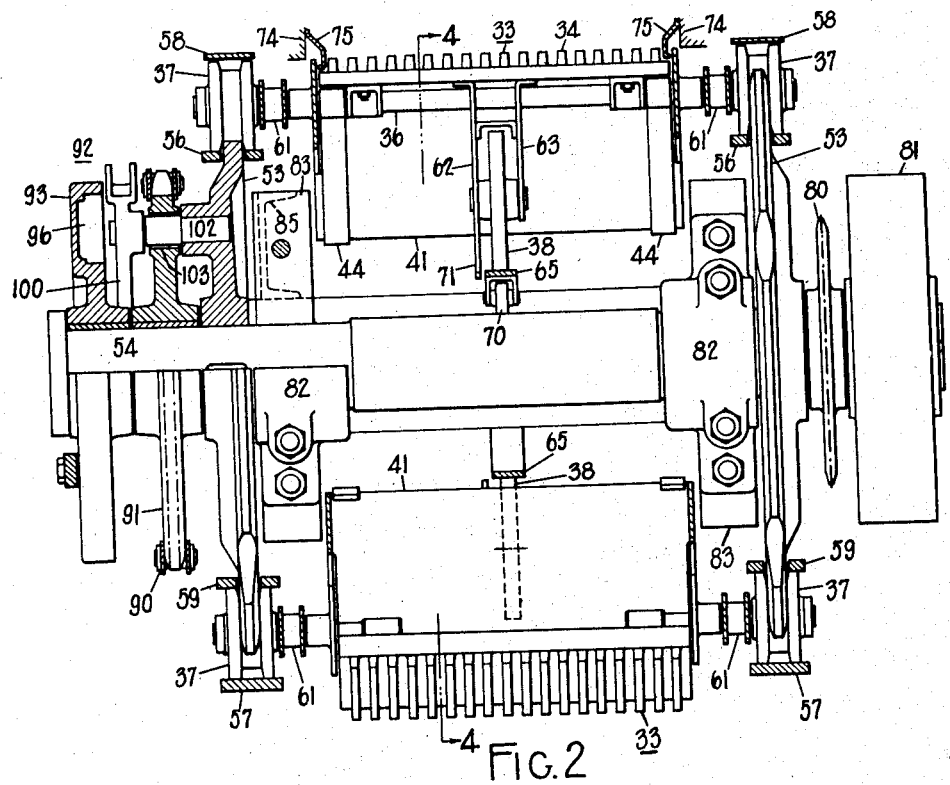
Figure 2 is an end view of the stairway at the upper landing looking in the direction of the lower landing.
Figures 3, 11:
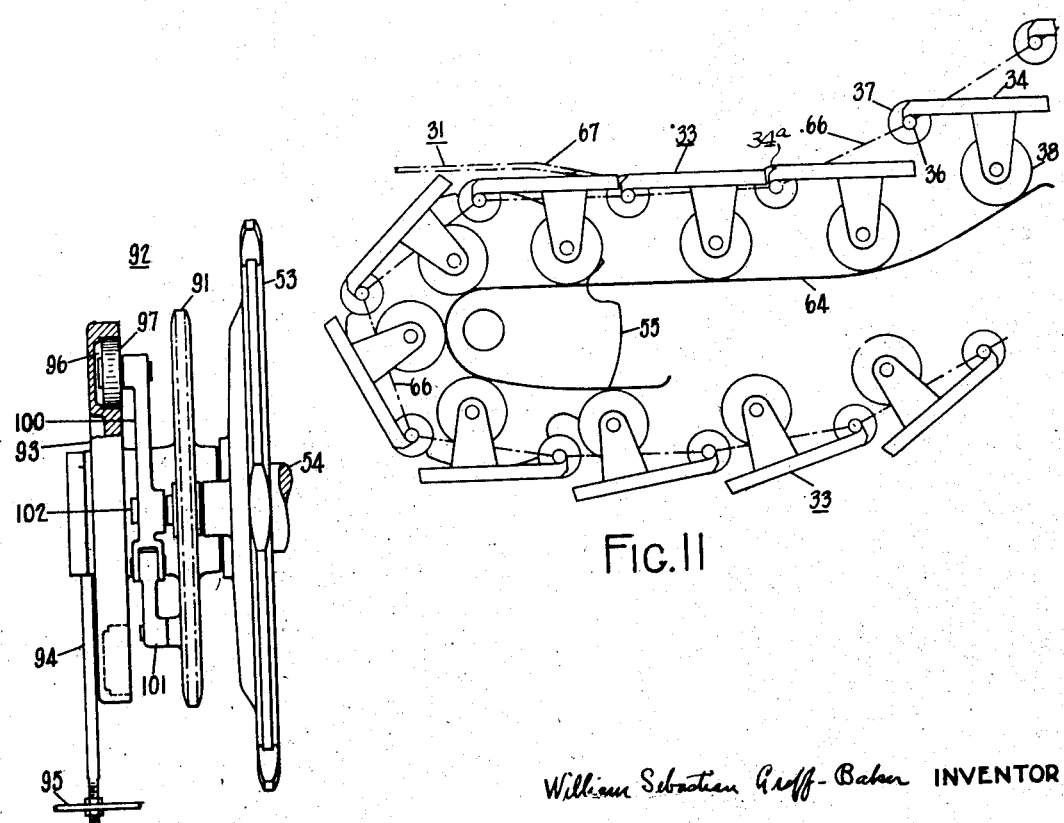
Figure 3 is a plan view of a portion of the stairway drive at the upper landing.
Figure 11 is a schematic view of the lower landing portion of a moving stairway in accordance with the invention, illustrating diagrammatically the manner in which the step treads of the step units are reversed in direction at the lower landing.
Figure 14:
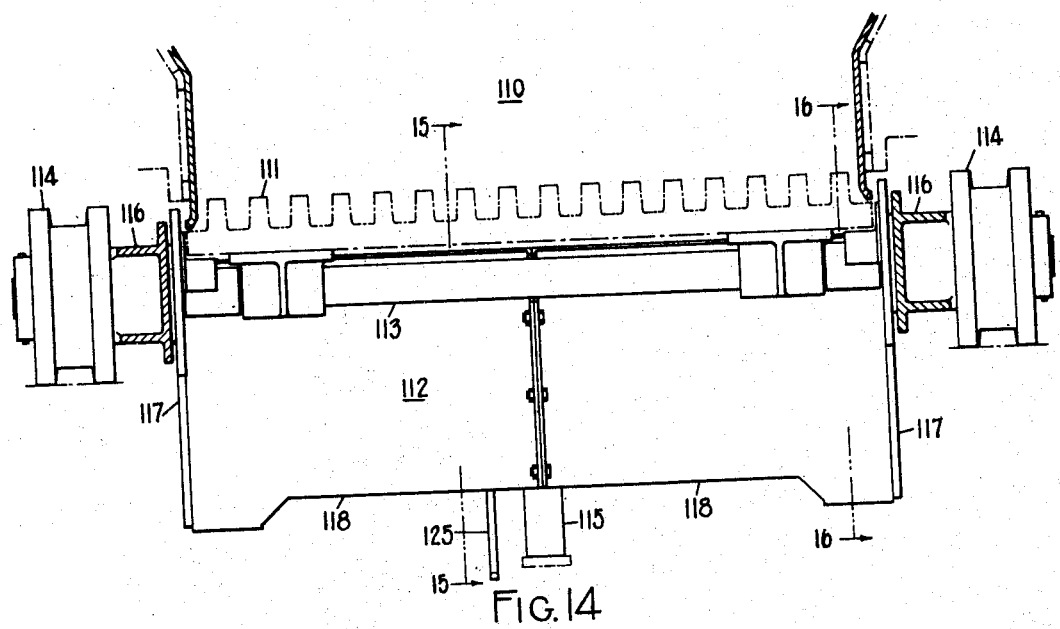
Figure 14 is an end view of the step unit and related apparatus, taken along the line 14—14 of Figure 13.
Figure 15:
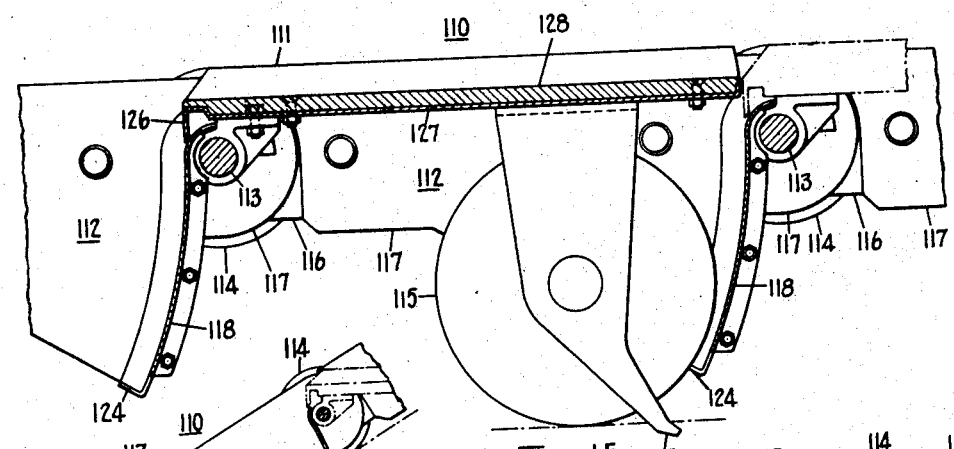
Figure 15 is a sectional view of a step unit taken along the line 15—15 of Figure 14.

At upper landing 32 two stairway sprocket wheels 53 are provided, one at each side of the stairway secured to a drive shaft 54 (see Figure 2). Each stairway sprocket wheel 53 is arranged to engage cylindrical surfaces 52 of step wheels 37 at the corresponding side of the stairway, and in this fashion to drive the stairway, as will appear as the description proceeds. At lower landing 31 similar stairway sprocket wheels 55 are provided, only one such sprocket wheel being shown in Figure 11.

Where step wheels 37 are not engaged by any stairway sprocket wheel, they roll upon, and are guided and supported by, suitable tracks 56 and 57, tracks 56 being the tracks on which the step wheels roll while moving on the upper, or working, run of the stairway and tracks 57 being the tracks on which the step wheels roll while moving on the lower, or return, run of the stairway. Preferably tracks 56 and 57 extend up to and slightly beyond a point vertically above, and a point vertically below, respectively, the axis of drive shaft 54, as illustrated in Figure 1, in order to insure the continuance of a support for each step unit by the tracks at all times except when cylindrical surfaces 52 of the step wheels are thoroughly seated in the recesses formed in stairway sprocket wheels 53. A similar construction is likewise employed at the lower landing. In addition to tracks 56 and 57 for the step wheels, up thrust tracks 58 and 59 are also provided.

In the construction illustrated in Figures 1–11, step axle 36 of each step unit is connected at each side of the stairway to the step axle of each adjacent step unit by means of a running gear chain 61 the chain pitch of which is equal to the step pitch (i. e., the distance between two adjacent step axles). Chain 61 is provided with hollow chain pins through which extend step axles 36, chain 61 being positioned between step wheels 37 and the longitudinal sides of step pockets 35.

Tread wheel 38 for each step unit is rotatably mounted upon the corresponding step tread 34 at the underside thereof. Preferably there is only one such tread wheel for each step tread, and preferably such tread wheel is positioned substantially midway between the sides of the step tread. In the construction illustrated in Figures 1–11, tread wheel 38 is rotatably mounted upon brackets 62 and 63 (Figure 2) that are suitably secured to the underside of the step tread and project downwardly therefrom along either side of tread wheel 38. Tracks for tread wheels 38 are provided at the lower and at the upper landings, track 64 being the tread wheel track at the lower landing (Figure 11) and track 65 being the tread wheel track at the upper landing (Figures 1 and 4).

Considering the progress of one step unit, tread wheel track 64 is engaged by the tread wheel of such step unit on the return run of the stairway (assuming the stairway to be operating in the ascending direction) as the step unit approaches the lower landing. Tread wheel track 64 is shaped so that, as the step unit at the lower landing is transferred from the return run to the upper, or working, run of the stairway, inward movement of the step tread with respect to the corresponding step pocket and the associated portions of the running gear chains (as diagrammatically represented by the dot-and-dash line 66 in Figure 11) is controlled so as gradually to bring the step tread to the horizontal position as it passes under the combplate 67 at the lower landing. At this time the free end of the step tread is supported by tread wheel track 64 through the intermediary of tread wheel 38.

Tread wheel track 64 is shaped so as to support and maintain the step tread horizontal while the corresponding step pocket and the associated portions of the running gear chains traverse the lower horizontal portion and the lower bend of the working run of the stairway, and enter the incline portion of the working run of the stairway. As the step unit traverses the lower bend and enters the incline portion, step tread 34 appears to rotate downwardly with respect to the sides of its step pocket. The actual movement involved, however, is an upward rotation of the sides of the step pocket relative to the step tread incident to the forming of the stair formation of the stairway. When the step unit is on the incline portion of the working run of the stairway, the free end of the step tread is supported by stops 45, and tread wheel track 64 is dispensed with.

As the step unit, while on the incline portion of the working run of the stairway, approaches the upper bend, tread wheel 38 of such step unit engages upper landing tread wheel track 65 (Figure 1). Tread wheel track 65 is shaped so as to support and maintain step tread 34 horizontal while the corresponding step pocket 33 and the associated portions of the running gear chains traverse the upper bend and the upper horizontal portion of the working run of the stairway. As the step unit traverses the upper bend and enters the upper horizontal portion, step tread 34 appears to rotate upwardly with respect to the sides of its step pocket. The actual movement involved, however, is a downward rotation of the sides of the step pocket relative to the step tread incident to the forming of the platform formation of the stairway.

Tread wheel 38 continues in engagement with tread wheel track 65 after the step tread passes under the combplate 68 at the upper landing, track 65 extending around drive shaft 54 at the upper landing so as to be engaged by the tread wheel as the associated step unit is transferred from the upper or working run of the stairway to the lower or return run, and as the associated step unit traverses the initial portion of the return run, as illustrated in Figure 4. To assist in supporting track 65, in addition to supporting brackets connecting the track to suitable stationary members, there is mounted on the underside of track 65, where it is vertically above drive shaft 54, a roller 70 arranged to bear upon drive shaft 54 and roll over the surface thereof when the drive shaft rotates.

While the step unit is on the return run of the stairway, the free end of step tread 34 is supported by the transverse side 41 of the associated step pocket 33 as a result of the engagement of an extension 71 of bracket 62 with such transverse side (Figures 1 and 4). When extension 71 is in engagement with transverse side 41, the step tread is in a position in which it is rotated outwardly with respect to the associated step pocket. The outward rotative movement of the step tread with respect to its associated step pocket, (still assuming the stairway to be operating in the ascending direction) is caused by the shape of tread wheel track 65 as the step units are transferred by the stairway sprocket wheels 53 at the upper landing from the working run to the return run of the stairway. The shape for track 65 illustrated in Figure 4 is such as to maintain step tread 34 horizontal while the associated step pocket 35, during the first stages of its transfer from the working to the return run, is rotated inwardly with respect to the step tread and until such time as such rotation brings extension 71 into engagement with transverse side 41 to prevent further relative rotation in this direction, and is such as thereafter to maintain extension 71 in engagement with transverse side 41. Such shape for tread wheel track 65 serves to move the step tread with respect to the step pocket so that the tread wheel clears drive shaft 54, and so that there is no jamming of adjacent step treads as the step units pass around the stairway sprocket wheels and over the upper bend of the return run. In addition, it brings about and maintains the maximum outward motion of the step tread relative to the step pocket before the step unit, in passing around stairway sprocket wheel 53, reaches a position where the action of gravity alone would cause such maximum outward motion of the step tread. As a result, the noise and shock which would be incident to such outward motion as a result of the action of gravity, if permitted, is avoided.

When the stairway is operating in the descending direction, the action of tread wheel track 65 at the upper landing is similar to the action of tread wheel track 64 at the lower landing, previously described in conjunction with ascending operation of the stairway, tread wheel tracks 64 and 65 being functionally complementary.

Each step tread 34 preferably comprises a step tread support 72, conveniently either a die casting or made of pressed sheet metal (see Figures 7-9) and a tread plate 73 removably secured to the step tread support in any convenient manner. Tread plate 73 is formed with cleats between which pass the teeth of the combplates at the ends of the stairway.

It is to be observed that while a step unit is in motion on the incline portion of the upper, or working, run of the stairway, the longitudinal sides 40 and 42 of such step pocket 35 are also in motion in the same direction and at the same speed so that garments and the like have no tendency to catch between the step tread and its immediate surroundings. It is also to be observed that at the lower and upper bends of the working run of the stairway (where the changes from the horizontal, or platform, formation to the stair formation, and vice versa, are made), the only motion of a step tread with respect to its immediate surroundings at either side is a gradual rotative one with respect to the longitudinal sides of the associated step pocket, so that at these points also the risk of catching garments and the like is minimized.

The balustrading is indicated at 74 in Figure 2.

Along the portion (sometimes termed "skirting board") of the balustrading at each side of the stairway adjacent the step treads is mounted a moulding strip, this moulding strip preferably extending for the entire working run of the stairway. For this moulding strip rubber may be employed, but it is preferred to employ an extruded metallic shape arranged to have a relatively small clearance between its lower end and the root of the cleat formations of the step treads. Moulding strip 75 thus not only serves to prevent foreign matter from falling into the region below the step treads, but to prevent outward rotation of the step tread with respect to the associated step pocket past the position which is normal when the step units are in platform formation.

Drive shaft 54 at the upper landing, in addition to having stairway sprocket wheels 53 mounted thereon and secured thereto (Figure 2), also has a handrail sprocket wheel 80 and the drum of a stairway brake diagrammatically represented by the rectangle 81, mounted thereon and secured thereto at one side of the stairway outside the plane of the stairway sprocket wheel 53 at such side of the stairway. Handrail sprocket wheel 80 preferably drives the handrails through the intermediary of a suitable jack shaft parallel to drive shaft 54 in order that the handrail at each side of the stairway may be driven in unison with each other and with the stairway step units.

Drive shaft 54 is supported by means of bearings 82 positioned at either side of the stairway between stairway sprocket wheels 53 (Figure 2). Bearings 82 are shown as split bearings, but, if desired, may be roller bearings. Each bearing 82 is mounted on a plate 83 which is supported from a cross beam 84 by means of a pair of cantilever brackets 85 (Figure 4). Stairway width is thereby reduced.

The stairway is driven by a suitable motor 86 (Figure 1), through the intermediary of reduction gearing 87, sprocket wheel 88, drive chain 90, sprocket wheel 91 of compensating drive generally designated 92, and the left hand stairway sprocket wheel 53 as viewed in Figure 2, and further, for driving the other side of the stairway, through the intermediary of drive shaft 54 and the right hand stairway sprocket wheel 53, since both stairway sprocket wheels 53 are keyed to drive shaft 54. Compensating drive 92 is provided, when stairway sprocket wheels 53 having a relatively small number of teeth such as five (as is illustrated) are employed, in order to drive stairway sprocket wheels 53 at an angular speed which varies cyclically in such a manner as to reduce the variations in the linear speed imparted to the step units incident to the employment of stairway sprocket wheels 53 of such character.

Compensating drive 92 comprises a normally stationary disc 93 mounted coaxially with drive shaft 54, disc 93 being prevented from rotating by means of a link 94 one end of which is eccentrically connected to disc 93 and the other end of which is adjustably fastened to a fixed member 95. Disc 93 has formed therein an annular cam trough 96 in which operates a cam roller 97, cam trough 96 and cam roller 97 being of such size that cam roller 97 may roll freely on either the outer cam surface or the inner cam surface of annular cam trough 96 with only a small clearance between the cam roller and the other cam surface. Cam trough 96 differs from a circular trough of a given outer and inner radius by the provision of a number of lobes 98, equal to the number of teeth in each sprocket wheel 53, in which, at each lobe, the inner and outer radius of the cam trough are greater than such given radius. Cam roller 97 is rotatably mounted at one end of a link 100, the other end of which is pivotally connected to one end of a second link 101. The other end of second link 101 is pivotally secured to sprocket wheel 91, this sprocket wheel being mounted coaxially with drive shaft 54 and so as to rotate relatively thereto. Left hand stairway sprocket wheel 53 is secured to link 100 by means of a pin 102, one end of such pin being fixedly secured to the end of stairway sprocket wheel and the other end, after passing through a suitable recess 103 in sprocket wheel 91, pivotally supports link 100.

In operation, sprocket wheel 91 of compensating drive 92 is driven by motor 86 at a substantially constant speed. Rotation of sprocket wheel 91 causes rotation of linkage 100 and 101 about drive shaft 54, and thus causes movement of cam roller 97 in cam trough 96. Assuming the rotation of sprocket wheel 91 to be in the clockwise direction as viewed in Figure 1, cam roller 97 operates on the outer cam surface of cam trough 96. Should cam trough 96 be a true circle, link 100 would not oscillate about pin 102 as sprocket wheel 91 rotates, and thus the stairway sprocket wheels 53 would be rotated synchronously with sprocket wheel 91. Due, however, to the irregular shape of cam trough 96, link 100 oscillates about pin 102 as sprocket wheel 91 rotates, and as such oscillation of link 100 about pin 102 advances or retards stairway sprocket wheels 53 with respect to sprocket wheel 91, stairway sprocket wheels 53 are driven at a cyclically varying angular speed.

In the stairway construction illustrated in Figures 1–11, it is to be observed that separate running gear chains 61 are employed at each side of the stairway, these chains taking most of the horizontal stresses of the stairway. If desired, such separate running gear chains may be dispensed with, and portions of the step pockets made sufficiently strong to withstand the longitudinal stresses of the stairway. This is conveniently effected by employing a composite structure which serves both as the longitudinal sides of the step pockets and as links of a running gear chain connecting adjacent step axles.

Illustrative of such a construction is the construction shown in Figures 12–18, wherein the stairway comprises a plurality of step units generally designated 110 pivotally mounted together to form an endless series of step units. Each step unit 110 comprises a step tread 111, a step pocket generally designated 112, a step axle 113, two step wheels 114 (one at each side of the stairway), and a tread wheel 115, together with certain other apparatus, as will become apparent as the description proceeds.

Step pocket 112 has two longitudinal sides, each of which is formed of two overlapping links 116 and 117 suitably secured together, preferably by bolts, as illustrated. Step pocket 112 also has a transverse side connecting the two longitudinal sides, the transverse side being formed of two curved plates 118, each secured at one end, as by welding, to the link 117 at the corresponding side of the stairway, the other end of plates 118 being in abutting relation and being secured together, preferably by bolts, as illustrated. Plates 118, as the transverse side of step pocket 112, serve as the riser for the step tread of the next adjacent step unit. Step axle 113 extends transversely across the stairway and through the longitudinal sides of step pocket 112. Step tread 111 is pivotally mounted at its nose upon step axle 113 so that it may rotate in step pocket 112 relatively to the sides thereof. The curvature of plates 118 being such that there is a uniform clearance between the plates and the free end of step tread 111 as the step tread rotates relatively to the step pocket.

Each link 117 of a step unit has secured at its leading end (assuming the stairway to be in operation in the ascending direction), a bushing 120 (Figure 12), through which extends step axle 113 for the preceding step unit. Each link 116 of a step unit is formed with a circular aperture 121 to fit over bushing 120 on the link 117 of the succeeding step unit. Links 116 and 117 for one step unit thus not only serve as the longitudinal sides of the step pocket for such step unit and pivotally connect such step pocket to the corresponding longitudinal sides of the step pockets of the adjacent step units, but also as a link of a single link running gear chain at the corresponding side of the stairway capable of withstanding the longitudinal stresses of the stairway.

In installing the stairway, links 116 and 117 at each side of the stairway need not be uncoupled for any step unit except for the final step unit which connects the ends of the step units to make an endless series thereof. After initial installation, repairs may readily be made to any part of any step unit without dismantling the entire stairway, by uncoupling links 116 and 117 for such step unit and link 116 for the preceding step unit, and also by unbolting the two plates 118 that serve as the transverse side for such step unit.

Each step axle 113 extends outwardly beyond the bushing 120 at each side of the stairway through which it passes, and on each such extension of step axle 113 is mounted the step wheel 114 for the corresponding side of the stairway. Step wheel 114 is similar to step wheel 37 illustrated in Figures 1–11, and is mounted on the step axle in a similar manner, bushing 122 being the bushing for step wheel 114 corresponding to bushing 46 for step wheel 37. To prevent rotation of step axle 113 with respect to link bushing 120, link bushing 120 and bushing 122 are interlocked at one or both sides of the stairway by means of a projection 123 on the former fitting within a suitable recess provided in the latter.

Tread wheel 115 for step tread 111 is rotatably mounted thereon at the underside thereof, and operates similarly as tread wheel 38 of Figures 1–11. Stops 124 and extension 125 support the free end of step tread 111 and determine its inward and outward limits of motion, respectively, similarly as stops 45 and extension 71 of Figures 1–11.

Each step axle 113 is concealed from view for the entire width of the stairway by extending the upper portion of the adjacent plates 118 up under the edge of a downwardly projecting lip 126 of the step tread support 127 for tread plate 128, this lip being arranged to overlap the upper portion of plates 118 at all times, and with a substantially constant clearance so that there is no pinching hazard.

Figures 16, 17:
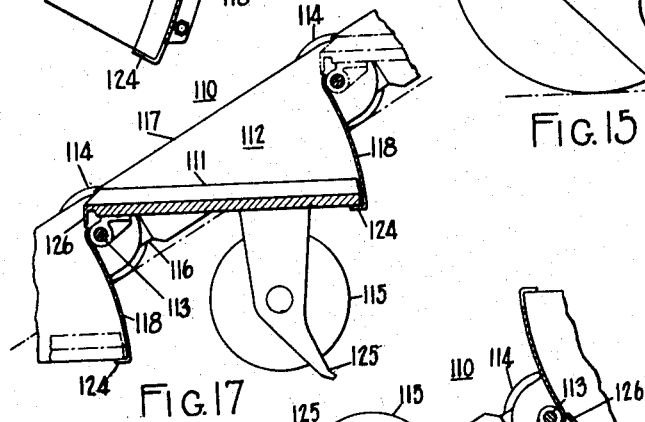
Figure 16 is a sectional view of a portion of a step unit taken along the line 16—16 of Figure 14.
Figure 17 is a longitudinal sectional view of the step unit of Figure 12 showing the position of the parts when the step unit is on the inclined portion of the working run of the stairway.
Figure 18:
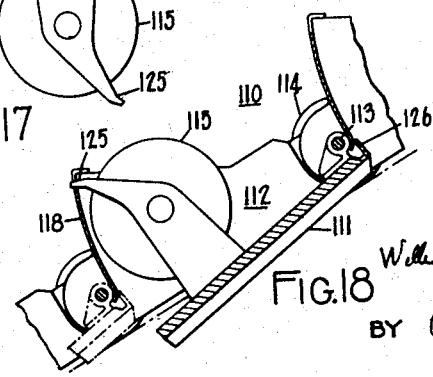
Figure 18 is a sectional view similar to that of Figure 17, illustrating the position of the parts when the step unit is on the inclined portion of the return run of the stairway.

Lubricant for link bushings 120 may be introduced in any desired manner through apertures 130 in links 116. The possibility of leakage of such lubricant into the region between the pairs of links 116 and 117 at each side of the stairway is remote, but as a final guard for preventing lubricant from working its way out to the visible portions of the stairway, the portions of plates 118 at each side of the stairway are further extended, as at 131 so as more completely to envelop the step axle (Figure 16).

Another construction in which the same structure serves both as the longitudinal sides of the step pockets and as links of a running gear chain connecting adjacent step axles, is illustrated in Figures 19–25. The step unit 140 thereof comprises a step tread 141, a step pocket generally designated 142, a step axle 143, two step wheels 144 (one at each side of the stairway), and a tread wheel 145, together with certain other apparatus, as will become apparent as the description proceeds.

Each of the two longitudinal sides of step pocket 142 comprises a link 146 and a longitudinal side 147 of a shield 148. Link 146, together with a link 150 parallel thereto but spaced therefrom, serve as links of a double-link running gear chain at the corresponding side of the stairway capable of withstanding the longitudinal stresses of the stairway, links 146 and 147 for alternate step units being secured together by hollow chain pins 151, and links 146 and 147 for the other step units being secured together by chain sleeves 152 which are fitted about, and rotatable with respect to, hollow chain pins 151. Each link 146, and thus each step pocket 142, is thereby pivotally connected to each adjacent step pocket. Each link 146 is formed with a triangular-shaped extension 153 at the underside of the leading end of such link, assuming the associated step unit to be on the working run of the stairway and moving in the ascending direction.

Shield 148, conveniently of pressed metal, comprises the previously mentioned two longitudinal sides 147, one adjacent each link 146 at either side of the stairway, and also comprises a transverse side 154 connecting the two longitudinal sides 147. The lower edge of each longitudinal side 147 of shield 148 is flanged, and by means of bolts passing through these flanges and through suitable projections 155 from the following edges of triangular-shaped extensions 153 of link 146, shield 148 is removably secured to links 146 at either side of the stairway. When shield 148 is in place, transverse side 154 thereof serves as the transverse side of step pocket 142, and thus, as the riser for the step tread of the next adjacent step unit.

Step axle 143 extends through and beyond corresponding hollow chain pins 151 at each side of the stairway, and on each such extension of step axle 143 is rotatably mounted the step wheel 144 for the corresponding side of the stairway. In so mounting each step wheel 144, a bushing 156 is preferably interposed between such step wheel and the step axle. Bushing 156 has formed at its outer end a collar 157 which serves to prevent outward axial motion of the step wheel, collar 157 being secured to step axle 143 by means of a suitable cotter or taper pin 158. To prevent rotation of step axle 143 in hollow chain pins 151, hollow chain pin 151 is interlocked with bushing 156 at one or both sides of the stairway by means of a projection 160 on the former fitting within a suitable recess provided in the latter.

Step tread 141 is pivotally mounted at its nose upon step axle 143, as by the split bearings 161, so that the step tread may rotate in step pocket 142 relatively to the sides thereof, the curvature of transverse side 154 being such that there is a uniform clearance between such side and the free end of step tread 141 as the step tread rotates relatively to the step pocket. Spacing sleeves 162 are provided on the step axle between links 146 and split bearings 161 for maintaining the step tread in its position along the step axle.

Tread wheel 145 for step tread 141 is rotatably mounted thereon at the underside thereof, and operates similarly as tread wheel 38 of Figures 1–11. Stops 163 and extension 164 support the free end of step tread 141 and determine its inward and outward limits of motion, respectively, similarly as stops 45 and extension 71 of Figures 1–11.

Each step axle 143 is concealed from view for the entire width of the stairway by extending the upper portion of transverse side 154 up under the edge of a downwardly projecting lip 165 of the step tread support 166 for tread plate 167, this lip being arranged to overlap the upper portion of transverse side 154 at all times, and with a substantially constant clearance so that there is no pinching hazard.

With the construction illustrated in Figures 19–25 it is preferred to provide a chain roller 168 about each chain bushing 152, and to have the stairway sprocket wheels engage such chain rollers, instead of engaging the tread wheels. The chordal pitch of the stairway sprocket wheels, however, remains equal to the step pitch of the stairway.

In fabricating a stairway in accordance with the construction illustrated in Figures 19–25, two double-link roller chains may be fabricated in accordance with standard practice, but employing for one of the two series of links for such chain the special shaped links 146. Shields 148 and step tread supports 166 may readily be formed from appropriate sheet metal stock. In installation, the double-link chains formed of links 146 and 150 at each side of the stairway, together with step axles 143, sleeves 162, bushings 156 and step wheels 144, may be installed at the same time. Thereafter, shields 148 may be inserted between corresponding links 146 at opposite sides of the stairway and secured in place, and then step treads 141 may be mounted upon the step axles. After initial installation, repairs to, and replacements of, any part of a step unit may be made readily and with a minimum dismantling of other parts of such step unit, and of other step units.

Inasmuch as many changes could be made in the above constructions and as many embodiments of this invention other than the three herein described and illustrated could be made without departing from the scope thereof, it is intended that all matter contained in the above description or shown in the accompanying drawings shall be interpreted as illustrative and not in a limiting sense.

What is claimed is:

1. In a moving stairway; an endless series of movable step units each having a step tread pivoted at its nose to the corresponding step unit; and means for maintaining the step tread of each step unit horizontal while such step unit is traversing the working run of the stairway.

2. In a moving stairway; an endless series of movable step units each having a step tread pivoted at its nose to the corresponding step unit; and means on each step unit supporting thereby the free end of the step tread of such step unit and causing such step tread to be horizontal while such step unit is traversing the incline portion of the working run of the stairway.

3. In a moving stairway; an endless series of movable step units each having a step tread pivoted at its nose to the corresponding step unit; means, including a tread wheel rotatably mounted upon the step tread of each step unit at the underside of such step tread substantially midway between its sides, and also including a tread wheel track, in the vicinity of the lower and the upper landings, upon which the tread wheels for said step units roll, for supporting the free end of the step tread for the corresponding step unit and causing such step tread to be horizontal while such step unit is traversing the lower and upper horizontal portions, and the lower and upper bends of the working run of the stairway; and means on each step unit supporting thereby the free end of the step tread of such step unit and causing such step tread to be horizontal while such step unit is traversing the incline portion of the working run of the stairway.

4. In a moving stairway; an endless series of step units each having a step axle extending transversely across the stairway and a step wheel mounted thereon at each side of the stairway rolling on a stairway track; a step tread for each step unit pivotally supported at its nose on the step axle for the corresponding step unit; and means for maintaining the step tread of each step unit horizontal while such step unit is traversing the working run of the stairway.

5. In a moving stairway; a plurality of movable step units each comprising a step pocket and a step tread; means connecting the step pockets of adjacent step units so as to form an endless series thereof; means supporting each step pocket comprising a step wheel rotatably mounted upon each step pocket at each side of the stairway and two step wheel tracks, one at each side of the stairway, upon which the step wheels at the corresponding side of the stairway roll; means pivotally mounting each step tread at its nose upon the step pocket of the corresponding step unit so that such step tread may rotate with respect to the sides of such step pocket to an inwardly rotated position in which such step tread is surrounded at its three sides away from its nose by the sides of such step pocket; and means controlling the position of each step tread with respect to its corresponding step pocket for maintaining the step tread of each step unit horizontal while such step unit is on the working run of the stairway, the step tread of each step unit rotating relatively to the sides of the step pocket of such step unit as such step unit traverses the lower and upper bends of the working run of the stairway and the step tread of each step unit being in said inwardly rotated position while such step unit is on the incline portion of the working run of the stairway.

6. In a moving stairway; a plurality of independent step units each comprising a step pocket having two longitudinal sides and a transverse side and each also comprising a step tread supported upon the corresponding step pocket so that the three sides thereof extend above the plane of the step tread of such step unit; and means pivotally connecting adjacent step units to form an endless movable series thereof in which the transverse side of the step pocket of each step unit serves as the riser for the step tread of the next adjacent step unit.

7. A step unit for a moving stairway comprising; a step pocket having two spaced longitudinal sides and a curved transverse side connecting said two longitudinal sides near one end thereof, the center of curvature of said transverse side being along a transverse axis near the other end of said two longitudinal sides; a step axle extending transversely between said two longitudinal sides coaxially with said axis of curvature of said transverse sides, and projecting through and beyond said two longitudinal sides; a step wheel mounted on each such projection of said step axle; a step tread; means pivotally supporting said step tread near one transverse side thereof upon said step axle; and means for limiting the inward and outward motion of said step tread in said pocket.

8. In a moving stairway; a plurality of independent step units each comprising a step pocket having two longitudinal sides and a transverse side and each also comprising a step tread supported upon the corresponding step pocket so that the three sides thereof extend above the plane of the step tread of such step unit; and means pivotally connecting adjacent step units to form an endless movable series thereof, the longitudinal sides of said step pockets acting as chain links to drive the step units.

9. In a moving stairway; a plurality of step units with pivoted rigid links connecting adjacent step units so that said links serve as an endless chain having a chain pitch equal to the step pitch of the stairway; rollers coaxial with the pivots of said links; a stairway sprocket wheel engaging said rollers for driving said stairway, said stairway sprocket wheel having a chordal pitch equal to the step pitch of the stairway, and having a relatively small number of teeth; and means for driving said stairway sprocket wheel at a cyclically varying angular speed from a uniformly driven drive sprocket wheel in order to cause said stairway sprocket wheel to drive said stairway at a uniform linear speed, said means comprising; an auxiliary sprocket wheel rotatably mounted adjacent to and coaxially with said stairway sprocket wheel and also rotatable with respect to said stairway sprocket wheel; means coupling said auxiliary sprocket wheel with the uniformly driven drive sprocket wheel so that said auxiliary sprocket wheel is driven at a substantially constant angular speed; a disc stationarily mounted adjacent and parallel to said auxiliary sprocket wheel, said disc having formed therein an annular cam groove of uniform radial width the inner surface of which is at an irregular radial distance from the axis of said auxiliary sprocket wheel, the irregularities consisting of a series of gradual variations in the radial distance of the inner surface of the cam groove from said axis to form a series of lobes equal in number to the number of teeth in said stairway sprocket wheel; linkage connecting said auxiliary sprocket wheel with said stairway sprocket wheel; and a follower, operating in said cam groove, mounted on said linkage and serving as the fulcrum thereof.

WILLIAM SEBASTIAN GRAFF-BAKER.